United States Patent Office 3,472,840
Patented Oct. 14, 1969

3,472,840
QUATERNARY NITROGEN-CONTAINING CELLULOSE ETHERS
Fred W. Stone, South Charleston, and John M. Rutherford, Jr., Charleston, W. Va., assignors to Union Carbide Corporation, a corporation of New York
No Drawing. Filed Sept. 14, 1965, Ser. No. 487,312
Int. Cl. C08b 11/14
U.S. Cl. 260—231
8 Claims

ABSTRACT OF THE DISCLOSURE

Novel cationic quaternary-nitrogen containing cellulose ethers having a backbone of anhydroglucose units with pendant substituent groups bearing a full positive charge spaced along this backbone. As a result of the presence of these positively charged groups imparting cationic character to the polymer, such ethers exhibit increased substantivity to a variety of substrates and, in consequence, find application in many areas where conventional cellulose ethers have been excluded, or perform in a relatively ineffective manner, because of their nonionic or anionic character.

---

This invention relates in general to cellulose derivatives and specifically to certain quaternary nitrogen-containing cellulose ethers which are new compositions of matter.

The novel cellulose ethers of this invention are polymers having a backbone of anhydroglucose units with pendant substituent groups bearing a full positive charge spaced along this backbone. As a result of the presence of these positively charged groups imparting cationic character to the polymer, the ethers of this invention exhibit increased substantivity to a variety of substrates and, in consequence, find application in many areas where conventional cellulose ethers have been excluded, or perform in a relatively ineffective manner, because of their nonionic or anionic character.

The essential substituent groups on the anhydroglucose backbone, in accordance with this invention, are ether groups comprising a quaternary-nitrogen radical. Additional ether groups which do not contain a quaternary-nitrogen radical may, and preferably will, also be present. The novel cellulose ethers are produced by etherification of a cellulosic material; the reactions involved in their preparation being the introduction of an ether group comprising a quaternary-nitrogen radical, hereinafter referred to as the quaternization reaction step, and, optionally, the introduction of non-cationic ether groups, hereinafter referred to as the etherification reaction step. As is hereinafter described in greater detail, the etherification and quaternization reaction steps may be effected sequentially, in either order and with or without isolation of the intermediate product, or simultaneously, depending on the composition and purity desired. Among the many uses for the novel cellulose ethers described herein, there may be mentioned their utility as flocculents, as pigment retention aids in paper-making, as antistatic agents for fibers and fabrics, as hand stiffeners for fabrics, in cosmetic formulations, in adhesives, in printing inks, and so forth.

The cellulose ethers of this invention are polymers of the structural formula:

$$\left[ \begin{array}{c} R\quad R\quad R \\ |\quad |\quad | \\ O\quad O\quad O \\ \searrow | \swarrow \\ R_{Cell} \end{array} \right]_y$$

where $R_{Cell}$ is the residue of an anhydroglucose unit ($C_6H_{10}O_5$), the R's may be the same or different and each R individually represents a substituent group of the formula given hereinbelow, and y represents the degree of polymerization and is an integer having a value of from about 50 to about 20,000, or more, and preferably from about 200 to about 5,000.

In the above structural formula each R individually represents a substituent group of the general formula:

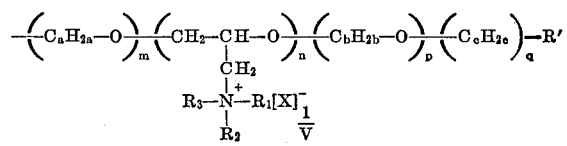

wherein:
a is an integer having a value of from 2 to 3;
b is an integer having a value of from 2 to 3;
c is an integer having a value of from 1 to 3;
m is an integer having a value of from zero to 10;
n is an integer having a value of from zero to 3;
p is an integer having a value of from zero to 10;
q is an integer having a value of from zero to 1;
R' is a member selected from the group consisting of

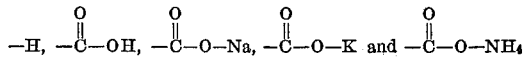

with the proviso that when q is zero then R' is —H;

$R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least 2 carbon atoms separating the oxygen atom from the nitrogen atom, and with the further proviso that the total number of carbon atoms in radicals represented by $R_1$, $R_2$ and $R_3$ is from 3 to 12;

$R_1$, $R_2$ and $R_3$, taken together, represent along with the nitrogen atom to which they are attached a member selected from the group consisting of pyridine, α-methylpyridine, 3,5-dimethylpyridine, 2,4,6-trimethylpyridine, N-methyl piperidine, N-ethyl piperidine, N-methyl morpholine and N-ethyl morpholine;

X is an anion such as chloride, bromide, iodide, sulfate, methylsulfate, sulfonate, nitrate, phosphate, acetate, etc., and V is an integer which is equal to the valence of X;

The average value of n per anhydroglucose unit is from about 0.01 to about 1 and preferably from about 0.1 to about 0.5; and The average value of $m+n+p+q$ per anhydroglucose unit is from about 0.01 to about 4, more preferably from about 0.1 to about 2.5, and most preferably from about 0.8 to about 2.

Illustrative of the numerous possible pendant groups on the anhydroglucose chain in accordance with the above generic description are the following:

—CH₃  —CH₂—CH₃

—CH₂—CH₂—OH

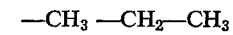

—CH₂—CH₂—O—CH₂—CH₂—OH

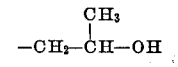

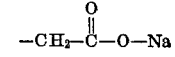

—CH₂—CH₂—O—CH₂—CH₂—O—CH₂—CH₂—OH

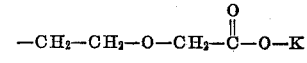

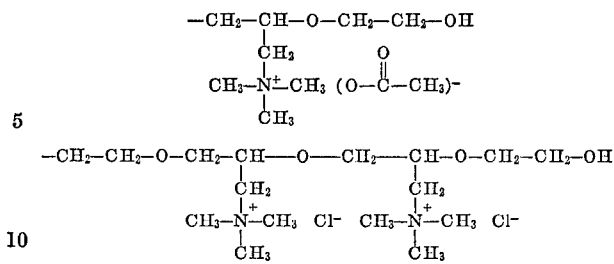

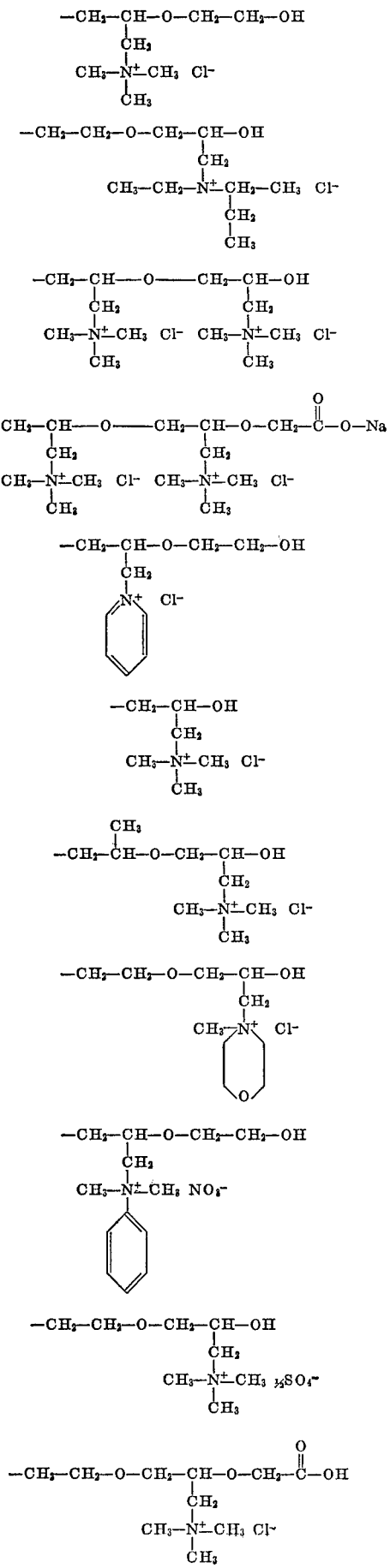

and so forth.

As would be apparent to one skilled in the art to which this invention pertains, the novel cellulose ethers disclosed herein vary in the extent to which they are water soluble, with solubility increasing with increase in the degree of substitution and decreasing with increase in the degree of polymerization. The extent to which they exhibit cationic character depends, of course, on the number of quaternary nitrogen-containing groups present and thus on the average value of $n$ in the generic formula.

As hereinbefore disclosed, where it is desired to prepare a cellulose ether having both quaternary-nitrogen containing ether group substituents and non-cationic ether group substituents, the order in which the etherification and quaternization of the cellulosic starting material is carried out is optional. Thus, these reactions may be carried out sequentially with either the etherification or the quaternization, as hereinbefore defined, as the first step and with or without isolation of the intermediate product. Where the quaternization is carried out as the first step this will, of course, result in the quaternary nitrogen-containing groups being adjacent to the chain of anhydroglucose units and where it is carried out as the final step it will result in the quaternary nitrogen-containing group forming the terminal portion of the pendant substituents. Alternatively, the etherification and quaternization reactions may be effected simultaneously to give a randomly substituted polymer product.

The cellulosic starting material employed in the preparation of the cellulose ethers of this invention may be any one of the cellulosic materials conventionally employed for preparation of cellulose ethers, such as chemical cotton, cotton linters, wood pulp, alkali cellulose, and the like.

In accordance with this invention, the etherification step effects substitution of the cellulose chain by an alkyl group of 1 to 3 carbon atoms, a carboxyalkyl group of 1 to 3 carbon atoms in the alkyl moiety, or a hydroxyalkyl group of 2 to 3 carbon atoms in the alkyl moiety. Accordingly, the etherifying agents of utility for the purposes of this invention are alkylating agents such as dimethyl sulfate, diethyl sulfate, methyl chloride, methyl bromide, ethyl chloride, ethyl bromide, or n-propyl chloride, hydroxyalkylating agents such as ethylene oxide or propylene oxide, and carboxyalkylating agents such as monochloroacetic acid, sodium chloroacetate, or chloropropionic acid. Suitable reaction conditions for effecting the etherification to introduce the non-cationic ether groups are the conditions employed in the preparation of conventional cellulose ethers such as methyl cellulose, hydroxyethyl cellulose, hydroxypropyl methyl cellulose, sodium carboxymethyl cellulose or sodium carboxymethyl hydroxyethyl cellulose, and these same conditions may be utilized whether the quaternization is effected before or after the etherification step. Thus, the etherification may be conducted at temperatures of from about 25° C. to about 125° C., preferably from about 45° C. to about 80° C., with or without the use of a diluent, and with a reaction time of from about 0.5 to about 10 hours or more, preferably from 1 to 4 hours. Alkaline catalysis is employed in all instances, with sodium hydroxide being the preferred catalyst. The amount of catalyst employed varies broadly, with the optimum amount depending on such factors as the particular ether being prepared, the amount of etherifying agent, the temperature, the reaction medium, etc. If desired, one may, of course, start with one of the commercially available cellulose ethers to prepare certain of the novel cellulose ethers disclosed herein rather than starting with a cellulosic material such as wood pulp.

The quaternization reaction step involved in the preparation of the novel compositions disclosed herein utilizes a quaternary ammonium salt to effect substitution of the cellulose chain with quaternary nitrogen-containing groups. The quaternary ammonium salts of utility for this purpose are quaternary halohydrins of the general formula:

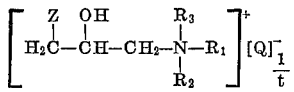

and quaternary epoxides of the general formula:

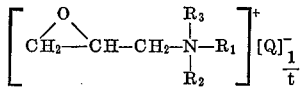

wherein $R_1$, $R_2$ and $R_3$ are as hereinbefore defined, Q is an anion of a strong mineral acid, $t$ is an integer which is equal to the valance of Q, and Z is chlorine, bromine or iodine.

The quaternary halohydrins of the formula given above are suitable prepared by reacting a strong mineral acid salt of a tertiary amine of the formula:

where $R_1$, $R_2$ and $R_3$ are as hereinbefore defined, with an epihalohydrin of the formula:

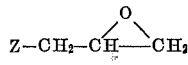

where Z is as defined above.

Referring to the tertiary amine hydrochlorides for illustration purposes, examples of suitable tertiary amine salts include trimethylamine hydrochloride, triethylamine hydrochloride, dimethylbenzylamine hydrochloride, dimethylcyclohexylamine hydrochloride, pyridine hydrochloride, N-methylmorpholine hydrochloride, N-methylpiperidine hydrochloride, and the like. Illustrative of the reaction of the tertiary amine salts with epihalohydrins to form the desired quaternary halohydrins, there may be mentioned the reaction of trimethylamine hydrochloride with epichlorohydrin to yield 3-chloro-2-hydroxypropyltrimethyl ammonium chloride, the reaction of triethylamine hydrochloride with epichlorohydrin to yield 3-chloro-2-hydroxypropyltriethyl ammonium chloride, the reaction of pyridine hydrochloride with epichlorohydrin to yield N-(3-chloro-2-hydroxypropyl)pyridinium chloride, and the like.

The tertiary amine salt may be reacted with the epihalohydrin to form the quaternary halohydrin at temperatures from about 0° C. to about 100° C., preferably from about 25° C. to about 75° C. The quaternary halohydrin thus obtained may be employed in the reaction with the cellulose or cellulose ether without isolation, or it may be first isolated and purified by recrystallization from a suitable alcohol such as ethanol or isopropanol . The quaternary halohydrin, in either the crude or purified form, may be reacted directly with the cellulose or cellulose ether to produce novel cellulose derivatives within the scope of the generic definition hereinbefore set forth or, if desired, the quaternary halohydrin can be reacted with a strong base, such as sodium hydroxide or potassium hydroxide, to convert it to a quaternary epoxide as defined hereinabove. The preparation of the quaternary epoxide is readily effected by reacting the quaternary halohydrin in aqueous solution with an equimolar quantity of base. Suitable temperatures for this reaction are from about 0° C. to about 75° C., and preferably from about 5° C. to about 50° C.

As hereinbefore disclosed, the quaternization step may be effected before, subsequent to, or simultaneously with the etherification step to produce novel compositions within the scope of the generic definition hereinbefore set forth. In each of these cases, comparable reaction conditions are effective. The quaternization reaction may be readily effected at temperatures of from about 5° C. to about 85° C., with preferred temperatures being in the range from about 40° C. to about 65° C. Any suitable technique may be utilized to accomplish contact of the cellulosic material with the quaternary ammonium salt to thereby introduce the quaternary nitrogen-containing groups into the product. Where the material subjected to quaternization is cellulose, it may be utilized as a finely-divided solid or in the form of a suspension in an inert diluent such as water, acetonitrile, lower aliphatic alcohols, acetone, dioxane, mono- and di-ethers of ethylene glycol, and the like. Where the material subjected to quaternization is a cellulose ether, such as hydroxyethyl cellulose, it may be employed as a finely-divided solid, or in the form of a suspension in an inert organic diluent, as set forth above, or as a solution in a suitable solvent, for example, as a solution in dimethylsulfoxide. Anhydrous reaction conditions can be employed but it is preferred that water be present in the reaction system. An amount of water in the range from about 0.2 part to about 5 parts per part of cellulosic material is particularly effective. The time required to accomplish the quaternization reaction will vary from about 0.5 to about 8 hours, or longer, more usually from about 1 to about 3 hours. Alkaline catalysts, such as sodium hydroxide, potassium hydroxide, lithium hydroxide, tetramethyl ammonium hydroxide, tetraethyl ammonium hydroxide, and the like, are employed to catalyze the quaternization reaction. The amount of catalyst utilized will depend primarily upon whether the quaternizing agent employed is the quaternary halohydrin or the quaternary epoxide, but also upon the degree of quaternization desired. Where the quaternary halohydrin is employed, an amount of catalyst of from slightly more than 1 to about 3 moles per mole of quaternary halohydrin is satisfactory, while when the quaternary epoxide is employed suitable amounts are from about 0.01 to about 2 moles per mole of quaternary epoxide.

In effecting the quaternization, the proportion of quaternary ammonium salt to cellulosic material may be in the range of from about 0.01 to about 3 moles of quaternary ammonium salt per anhydroglucose unit of the cellulosic material, preferably from about 0.1 to about 2.5 moles per anhydroglucose unit.

The anion moiety of the novel cellulose ethers of this invention may be derived directly from the aforementioned quaternary ammonium salts, ie.. it may be the anion associated with the quaternary ammonium salt, or it may be an anion which has been introduced through ion exchange of the product. Thus, for example, where the quaternary ammonium salt employed to effect introduction of the quaternary nitrogen-containing group is an ammonium chloride, such as 3-chloro-2-hydroxypropyltrimethyl ammonium chloride, the anion will be the chloride ion; but the product may be subsequently ion-exchanged to give, for example, the nitrate, sulfate or acetate. Such ion exchange is readily accomplished by titrating the solution of quaternary nitrogen-containing cellulose ether with a soluble silver salt, by passing the solution through a column containing a conventional anion exchange resin, or by dialysis of the solution after addition of a large amount of the desired anion.

It should be noted that where a substituent on the anhydroglucose chain terminates in a carboxylate salt, some or all of the ions normally associated with the carboxylate and quaternary nitrogen groups may be lacking since these oppositely charged groups can neutralize each other. The extent to which the normally associated ions are lacking depends on the average value of $n$ and $q$ per anhydroglucose unit in the structural formula hereinbefore set forth and also on the degree of purification of the product.

The invention is further illustrated by the following specific examples of its practice.

EXAMPLE 1

To a one liter resin kettle fitted with a stirrer, condenser, and dropping funnel there were charged 34.3 grams of cellulose having a degree of polymerization of about 1500, and 480 milliliters of aqueous isopropanol. The resulting slurry was stirred for ½ hour and then 45.3 milliliters of a 20 percent by weight aqueous sodium hydroxide solution was added. After stirring for an additional ½ hour, 37.7 milliliters of ethylene oxide was added and the reaction mixture was heated to 50° C. and maintained at this temperature for 2 hours, at which point 45 milliliters of an aqueous solution consisting of 0.2 mole of 3-chloro-2-hydroxypropyltrimethyl ammonium chloride in water was added. The reaction mixture was held at 50° C. for 2 hours, then heated to 76° C. and maintained at this temperature for 15 minutes, whereupon 15 milliliters of acetic acid was added to neutralize the mixture. Upon filtering the reaction mixture, washing the filter cake three times, and drying to constant weight in a 45° C. vacuum oven, there was obtained a yield of 84.6 grams of a crude quaternary nitrogen-containing hydroxyethyl cellulose. Two precipitations of the crude product in acetonitrile yielded a purified quaternary nitrogen-containing hydroxyethyl cellulose containing 2.3 percent chloride ion, corresponding to a substitution level of 0.175 mole bound quaternary nitrogen per anhydroglucose unit.

EXAMPLE 2

To a 250 milliliter flask fitted with a brine-cooled condenser and a magnetic stirrer there were charged 4.0 grams of hydroxyethyl cellulose (having a degree of polymerization of about 1000 and about 1.8 moles of substituent ethylene oxide per mole of anhydroglucose unit), 75 grams of acetonitrile, and 11 grams of an aqueous solution containing 0.033 mole of 2,3-epoxy-propyltrimethyl ammonium chloride and a small, undetermined amount of sodium hydroxide and the flask was then heated in an oil bath at 50° C. for about 16 hours. Upon filtering the reaction mixture and washing the filter cake twice with acetonitrile and three times with acetone, there was obtained a yield of 10.26 grams of a crude quaternary nitrogen-containing hydroxyethyl cellulose. Two precipitations of the crude product in acetonitrile yielded a purified quaternary nitrogen-containing hydroxyethyl cellulose containing 3.28 percent chloride ion, corresponding to a substitution level of 0.26 mole bound quaternary nitrogen per anhydroglucose unit.

EXAMPLE 3

A slurry of 48 grams of hydroxyethyl cellulose (having a degree of polymerization of about 1000 and about 1.8 moles of substituent ethylene oxide per mole of anhydroglucose unit) in acetonitrile was heated to 50° C. To the slurry there was added a solution of 0.4 mole of 2,3-epoxypropyltrimethyl ammonium chloride in 120 milliliters of water containing a small, undetermined amount of sodium hydroxide and the reaction was stirred for 5 hours at 50° C. and then neutralized by the addition of 20 milliliters of acetic acid. Upon filtering the reaction mixture, washing the filter cake twice, and drying to constant weight in a 45° C. vacuum oven, there was obtained a yield of 100.5 grams of a crude quaternary nitrogen-containing hydroxyethyl cellulose. Analysis of this material showed that it contained 12.85 percent chloride ion. The crude product was purified by subjecting a 3 percent aqueous solution to two successive precipitations in a large excess of acetonitrile with a resultant analysis of 4.3 percent chloride ion. Further purification of an aqueous solution of the polymer, by exhaustive dialysis until no more chloride ion passed through the membrane, yielded a purified quaternary nitrogen-containing hydroxyethyl cellulose containing 3.2 percent chloride ion, corresponding to a substitution level of 0.25 mole bound quaternary nitrogen per anhydroglucose unit.

EXAMPLE 4

In a similar manner to that described in Example 3, 96 grams of hydroxyethyl cellulose (having a degree of polymerization of about 1000 and about 1.8 moles of substituent ethylene oxide per mole of anhydroglucose unit) was reacted with 0.2 mole of 2,3-epoxypropyltrimethyl ammonium chloride to yield 113.9 grams of crude quaternary nitrogen-containing hydroxyethyl cellulose which analyzed for 6.0 percent chloride ion. Purification of the crude product yielded purified quaternary nitrogen-containing hydroxyethyl cellulose containing 0.67 percent chloride ion, corresponding to a substitution level of 0.05 mole of bound quaternary nitrogen per anhydroglucose unit.

EXAMPLE 5

In a similar manner to that described in Example 3, 48 grams of hydroxyethyl cellulose (having a degree of polymerization of about 200 and about 1.8 moles of substituent ethylene oxide per mole of anhydroglucose unit) was reacted with 0.4 mole of 2,3-epoxypropyltrimethyl ammonium chloride to yield 128.7 grams of crude quaternary nitrogen-containing hydroxyethyl cellulose which gave a chloride analysis of 16.3 percent. Purification of the crude product yielded purified quaternary nitrogen-containing hydroxyethyl cellulose containing 2.44 percent chloride ion, corresponding to a substitution level of 0.18 mole of bound quaternary nitrogen per anhydroglucose unit.

EXAMPLE 6

In a similar manner to that described in Example 3, 24 grams of hydroxyethyl cellulose (having a degree of polymerization of about 1000 and about 0.9 mole of substituent ethylene oxide per mole of anhydroglucose unit) was reacted with 0.2 mole of 2,3-epoxypropyltrimethyl ammonium chloride to yield 43.6 grams of crude quaternary nitrogen-containing hydroxyethyl cellulose containing 15.0 percent chloride ion. Purification by two successive precipitations in acetonitrile gave a product containing 5.4 percent chloride ion while subsequent exhaustive dialysis yielded a purified quaternary nitrogen-containing hydroxyethyl cellulose containing 4.6 percent chloride ion, corresponding to a substitution level of 0.33 mole bound quaternary nitrogen per anhydroglucose unit.

EXAMPLE 7

A slurry of 24 grams of hydroxyethyl cellulose (having a degree of polymerization of about 5000 and about 1.8 moles of substituent ethylene oxide per mole of anhydroglucose unit) in 450 grams of aqueous isopropanol was stirred at room temperature for ½ hour. A solution of 8.5 grams of sodium hydroxide in 8.5 grams of water was added to the slurry and after one hour the mixture was cooled to 5° C. and then 52.5 grams of an aqueous solution containing 0.2 mol 3-chloro-2-hydroxypropyltrimethyl ammonium chloride was added. The mixture was held for 2 hours at 5° C. and then heated to 50° C. and held at that temperature for 3 hours, at which point it was neutralized by the addition of 13 milliliters of acetic acid. After 15 minutes the product was recovered by filtration, washed three times, and dried to a constant weight in a 45° C. vacuum oven to yield 52 grams of crude quaternary nitrogen-containing hydroxyethyl cellulose. Purification by two successive precipitations in acetonitrile yielded quaternary nitrogen-containing hydroxyethyl cellulose containing 4.7 percent chloride ion, corresponding to a substitution level of 0.4 mole of bound quaternary nitrogen per anhydroglucose unit.

A solution of 0.55 gram of the above-described quaternary nitrogen-containing hydroxyethyl cellulose was titrated with silver nitrate to the stoichiometric end-point to convert it to the nitrate form. After digesting for several days, the solution was centrifuged and the product recovered by precipitation in acetone to yield 0.30 gram of product in the nitrate form.

EXAMPLE 8

A slurry of 24 grams of hydroxyethyl cellulose (having a degree of polymerization of about 1000 and about 1.8 moles of substituent ethylene oxide per mole of anhydroglucose unit) in 450 grams of acetonitrile was stirred for ½ hour while heating to 50° C. An aqueous solution of 0.215 mole of 2,3-epoxypropyltriethyl ammonium chloride was then added to the slurry and the temperature was maintained at 50° C. for 4½ hours. The reaction mixture was then neutralized by the addition of 0.22 mole of acetic acid, stirred for 15 minutes, and let stand overnight. The product was recovered by filtration, washed three times, and dried to constant weight in a 45° C. vacuum oven to yield 35.2 grams of a crude quaternary nitrogen-containing hydroxyethyl cellulose. Purification by two successive precipitations in acetonitrile yielded a purified quaternary nitrogen-containing hydroxyethyl cellulose containing 0.8 percent chloride ion, corresponding to a substitution level of 0.057 mole bound quaternary nitrogen per anhydroglucose unit.

EXAMPLE 9

A slurry of 24 grams of hydroxypropyl methyl cellulose (having a degree of polymerization of about 500) in 450 grams of acetonitrile was stirred for ½ hour at room temperature. To the slurry there was added 17 grams of 50 percent aqueous sodium hydroxide and after stirring at room temperature for one hour the slurry was cooled to 5° C. and then 52.6 grams of an aqueous solution of 0.2 mole of 3-chloro-2-hydroxypropyltrimethyl ammonium chloride was added. After stirring for one hour at 5° C., the mixture was heated to 50° C. and held at that temperature for 3 hours, at which point it was neutralized by addition of 12.5 milliliters of acetic acid and stirred for an additional 15 minutes. The reaction product was recovered by filtration, washed three times and dried to constant weight in a 45° C. vacuum oven to yield 34.4 grams of crude quaternary nitrogen-containing hydroxypropyl methyl cellulose. Purification by two successive precipitations in acetonitrile gave a product containing 1.7 percent chloride ion while subsequent purification by exhaustive dialysis yielded purified quaternary nitrogen-containing hydroxypropyl methyl cellulose containing 1.4 percent chloride ion, corresponding to a substitution level of 0.063 mole bound quaternary nitrogen per anhydroglucose unit.

EXAMPLE 10

To a slurry of 48 grams hydroxyethyl cellulose (having a degree of polymerization of about 1000 and about 1.8 moles of substituent ethylene oxide per mole of anhydroglucose unit) in 900 grams of acetonitrile there was added an aqueous solution containing 0.4 mole 2,3-epoxypropyltrimethyl ammonium chloride in 120 milliliters of water and a small, undetermined amount of sodium hydroxide. The admixture was stirred for 2 hours at 5° C., heated to 50° C. and held at that temperature for 3 hours, and then neutralized by addition of 26 milliliters acetic acid. The product was recovered by filtration, washed three times, and dried to constant weight in a 45° C. vacuum oven to yield 118.5 grams of a crude quaternary nitrogen-containing hydroxyethyl cellulose. Purification of a portion of this crude material by two precipitations in acetonitrile yielded a purified quaternary nitrogen-containing hydroxyethyl cellulose containing 4.77 percent chloride ion, corresponding to a substitution level of 0.41 mole bound quaternary nitrogen per anhydroglucose unit.

A solution of 0.5 gram of the above-described quaternary nitrogen-containing hydroxyethyl cellulose in 100 milliliters of water was passed through a column filled with a strongly basic anion exchange resin, which had previously been exhaustively washed with aqueous sodium sulfate solution until no more chloride ion was eluted. Substantially complete conversion of the composition into the sulfate form resulted.

A solution of 1.0 gram of the above-described quaternary nitrogen-containing hydroxyethyl cellulose in 50 milliliters of distilled water was titrated to the disappearance of chloride ion with 21.5 milliliters of saturated aqueous silver acetate solution. Substantially complete conversion of the composition into the acetate form resulted.

EXAMPLE 11

To a slurry of 17.15 grams of cellulose in 240 milliliters of aqueous isopropanol there was added 22.7 milliliters of 20 percent aqueous sodium hydroxide and the admixture was stirred for 30 minutes. An aqueous solution consisting of 18.8 grams of 3-chloro-2-hydroxypropyltrimethyl ammonium chloride in 22.5 milliliters of water was then added at room temperature and after one hour had elapsed the mixture was heated to 50° C. and held at that temperature for 3 hours. After neutralization by addition of 8 milliliters of acetic acid, the product was recovered by filtration, thoroughly washed with water until no chloride ion could be detected in the filtrate and dried to constant weight in a 60° C. vacuum oven to give a yield of 15.4 grams. Analysis of this material showed that it contained 2.46 percent chloride ion, corresponding to a substitution level of 0.125 mole bound quaternary nitrogen per anhydrogluclose unit.

To a suspension of 10 grams of the above-described quaternary nitrogen-containing cellulose in 144 grams of aqueous isopropanol there was added 13.3 milliliters of 20 percent aqueous sodium hydroxide and the mixture was stirred for 30 minutes. At this point, 11 milliliters of ethylene oxide was added and the mixture was heated to 76° C. over 45 minutes and held at this temperature for an additional 15 minutes. After neutralizing by addition of 4.8 milliliters acetic acid, the product was recovered by filtration, washed and dried to constant weight to yield 14.4 grams. A solution of 4.1 grams of the product in 208 milliliters of water was titrated to a pH of 3.25 with dilute hydrochloric acid and then precipitated in acetonitrile. After a second precipitation in acetonitrile, there was recovered 2.92 grams of a quaternary nitrogen-containing hydroxyethyl cellulose which analyzed for 1.92 percent chloride ion, corresponding to a substitution level of 0.14 mole bound quaternary nitrogen per anhydroglucose unit.

EXAMPLE 12

To a suspension of 24 grams hydroxyethyl cellulose (having a degree of polymerization of about 1000 and about 1.8 moles of substituent ethylene oxide per mole of anhydroglucose unit), in 450 grams of acetonitrile at 5° C. there was added an aqueous solution containing 0.2 mole sodium hydroxide and 0.2 mole N-(3-chloro-2-hydroxypropyl)pyridinium chloride (prepared by reaction of equimolar amounts of pyridine hydrochloride and epichlorohydrin at 50° C.). After stirring for 1 hour at 5° C., the mixture was heated to 50° C. and maintained at that temuerature with stirring for 3 hours. After neutralization by addition of 12 milliliters of acetic acid, the product was recovered by filtration, washed, and dried in a 60° C. vacuum oven to yield 45.17 grams of a crude quaternary nitrogen-containing hydroxyethyl cellulose which upon purification analyzed for 1.64 percent chloride ion, corresponding to a substitution level of 0.12 mole bound quaternary nitrogen per anhydroglucose unit.

EXAMPLE 13

To a suspension of 85.75 grams of wood pulp in 1200 milliliters of aqueous isopropanol there was added 36.4 milliliters of 50 percent aqueous sodium hydroxide. After stirring for 15 minutes at 25° C., the mixture was cooled to 5° C. and then 52.4 milliliters of 50 percent sodium hydroxide and a solution consisting of 188 grams of 3-chloro-2-hydroxypropyltrimethyl ammonium chloride in 37 grams of water were added. After stirring for 30 minutes at 5° C., the mixture was heated to 60° C. and maintained at this temperature with stirring for 3½ hours. Following neutralization by addition of 60 milliliters of acetic acid, the product was recovered by filtration, washed with water, and dried to constant weight in a 60° C. vacuum oven to yield 80 grams of quaternary nitrogen-containing cellulose which analyzed for 2.04 percent chloride ion, corresponding to a substitution level of 0.105 mole bound quaternary nitrogen per anhydroglucose unit.

To a suspension of 6.0 grams of the above-described quaternary nitrogen-containing cellulose in 84 milliliters of aqueous isopropanol there was added 4.8 milliliters of 50 percent sodium hydroxide. After stirring for 15 minutes, 3.9 milliliters of 80 percent aqueous monochloroacetic acid was added, the mixture was stirred for an additional 15 minutes and then heated to 65° C. and maintained at this temperature for 2½ hours. Following neutralization by addition of acetic acid, the product was recovered by filtering, washed, and dried to constant weight in a 60° C. vacuum oven to yield 9.63 grams of crude quaternary nitrogen-containing carboxymethyl cellulose which after purification by precipitation in acetonitrile contained 0.81 percent nitrogen.

EXAMPLE 14

To a suspension of 34.3 grams of food pulp in 480 milliliters of aqueous isopropanol there was added 45.4 milliliters of 20 percent sodium hydroxide. After stirring for 30 minutes at room temperature, 21.6 milliliters of ethylene oxide was added and the mixture was heated to 76° C. and maintained at this temperature for 15 minutes whereupon 4.8 milliliters of aqueous 30 percent hydrogen peroxide was added. The mixture was then stirred for an additional 30 minutes and then a solution of 41.3 grams of 3-chloro-2-hydroxypropyltrimethyl ammonium chloride in 16 grams of water was added and the mixture reacted at 50° C. for 2 hours. Following neutralization by addition of 16.5 milliliters of acetic acid, the product was recovered by filtering, washed, and dried to constant weight in a 60° C. vacuum oven to yield 78.9 grams of a crude quaternary nitrogen-containing hydroxyethyl cellulose. A portion of the crude product was dialyzed until no more chloride ion passed through the membrane and then recovered by evaporation of the water to yield a quaternary nitrogen-containing hydroxyethyl cellulose having a reduced viscosity at 0.2 percent concentration in water of 1.45 deciliters per gram and analyzing 0.57 percent chloride ion, corresponding to a substitution level of 0.034 mole bound quaternary nitrogen per anhydroglucose unit.

EXAMPLE 15

To a slurry of 24 grams of methyl cellulose in 197 grams of aqueous isopropanol at 25° C. there was added 33.4 milliliters of 20.6 percent aqueous sodium hydroxide. The stirred slurry was then cooled to 5° C. and a solution of 37.6 grams of 3-chloro-2-hydroxypropyltrimethyl ammonium chloride in 16 grams of water was added. The resulting mixture was then heated to 65° C. for 3½ hours and neutralized by addition of 1 milliliter of acetic acid. After adding 200 milliliters of aqueous sopropanol, a crude quaternary nitrogen-containing methyl cellulose was recovered by pouring the mixture into 2 liters of acetone, filtering, and drying in a 60° C. vacuum oven. Purification of the crude product by two successive precipitations in acetone gave a quaternary nitrogen-containing methyl cellulose which analyzed for 2.44 percent chloride ion, corresponding to a substitution level of 0.143 mole bound quaternary nitrogen per anhydroglucose unit.

EXAMPLE 16

To a slurry of 17.5 grams of cellulose in 197 grams of aqueous isopropanol there was added 5.25 milliliters of 50 percent aqueous sodium hydroxide. There was then added, with stirring, 25 milliliters of ethylene oxide and a solution consisting of 7.57 grams of 2,3-epoxypropyltrimethyl ammonium chloride in 6 grams of water. The mixture was then heated to 65° C., maintained at this temperature for 2½ hours, and then neutralized by addition of acetic acid. After filtering, washing the product three times, and drying to constant weight in a 45° C. vacuum oven, there were obtained 29.2 grams of a crude quaternary nitrogen-containing hydroxyethyl cellulose. Two precipitations in acetonitrile yielded a purified product, which by analysis containing 1.75 moles of ethylene oxide and 0.054 mole of bound quaternary nitrogen per anhydroglucose unit.

EXAMPLE 17

To a stirred mixture of 137.2 grams of cellulose in 1576 grams of aqueous isopropanol there was added 181.6 milliters of 20 percent aqueous sodium hydroxide. After an hour had elapsed, there was added a solution of 150 grams of 3-chloro-2-hydroxypropyltrimethyl ammonium chloride in 64 grams of water. The mixture was stirred for 1 hour and then heated to 50° C. and maintained at that temperature for 3 hours, whereupon the excess caustic was neutralized by addition of an aqueous solution of ammonium chloride. The product was recovered by filtering, washed six times with water, and dried in a 60° C. vacuum oven to yield 136 grams of quaternary nitrogen-containing cellulose, which by chloride analysis was found to contain 0.175 mole of bound quaternary nitrogen per anhydroglucose unit.

EXAMPLE 18

The quaternary nitrogen-containing hydroxyethyl cellulose prepared in Example 2 above was employed as a flocculent for paper pulp. To a pulp slurry consisting of 2 grams of bleached kraft pulp (Canadian Standard Freeness of 475) in 2000 milliliters of distilled water, with the pH adjusted to 4.5 by addition of acetic acid, there were added various amounts of the quartenary nitrogen-containing hydroxyethyl cellulose and the degree of flocculation was determined by measuring the clarity of the supernatant liquid with a spectrophotometer at 450 m$\mu$ after a 10 minute settling period. Results are reported in Table I below in terms of percent efficiency defined as the light transmission obtained multiplied by one hundred and divided by the total available light transmission at 450 m$\mu$ (the percent efficiency for distilled water being 100 percent).

TABLE I

| Concentrated (Weight percent based on dry pulp): | Efficiency percent |
|---|---|
| 0 | 0 |
| 0.01 | 16 |
| 0.02 | 33 |
| 0.03 | 50 |
| 0.04 | 67 |
| 0.05 | 81 |

EXAMPLE 19

The quaternary nitrogen-containing hydroxyethyl cellulose prepared in Example 1 above was employed as a flocculent for silica. To a stirred 200 milliliter sample of a freshly prepared one percent aqueous suspension of silica that had been aged 2 hours and adjusted to the desired pH with small amounts of hydrochloric acid or sodium hydroxide there were added measured amounts of a 0.625 weight percent aqueous solution of the quaternary nitrogen-containing hydroxyethyl cellulose. After 5 minutes of agitation the suspension was allowed to settle for 5 minutes and the clarity of the supernatant liquid was determined with a colorimeter. The results are summarized in Table II below:

TABLE II

| Concentration (weight percent based on silica) | Percent transmission | | |
|---|---|---|---|
| | pH=4.0 | pH=7.0 | pH=10.0 |
| 0 | 0 | 0 | 0 |
| 0.003 | 20 | | |
| 0.005 | 57 | 14 | 50 |
| 0.0075 | 79 | | 74 |
| 0.01 | | 47 | |
| 0.02 | 82 | | 84 |
| 0.03 | 61 | 84 | 78 |
| 0.04 | | 78 | |
| 0.05 | | 60 | |
| 0.06 | 16 | 48 | 38 |
| 0.07 | | 33 | |
| 0.08 | | 22 | |
| 0.10 | | | 10 |

EXAMPLE 20

Several quaternary nitrogen-containing cellulose ethers prepared in accordance with this invention were employed as flocculents for clay. A 1 percent suspension of kaolin clay at a pH of approximately 7 was flocculated with a measured amount of the cellulose ether and after a settling period of 5 minutes the clarity of the supernatant liquid determined. Results are summarized in Table III below:

TABLE III

| Cellulose ether | Concentration (weight percent based on clay) | Percent transmission |
|---|---|---|
| Control | 0 | 0 |
| Example 1 | 0.65 | 85 |
| Example 2 | 0.25 | 25 |
| Example 3 | 0.475 | 83 |
| Example 6 | 0.40 | 86 |
| Example 8 | 0.67 | 57 |

EXAMPLE 21

The quaternary nitrogen-containing hydroxyethyl cellulose prepared in Example 7 above was employed as a flocculent for coal dust. Measured amounts of the cellulose ether were added with stirring to 200 milliliter samples of coal wash water. Following 5 minutes of agitation, sludge volumes were recorded during a 10 minute settling period and the clarity of the supernatant liquid determined. Results are summarized in Table IV below:

TABLE IV

| Concentration (milligrams per liter) | Cumulative sludge volume (ml./200 ml.) | | | | Percent transmission |
|---|---|---|---|---|---|
| | 0.25 min. | 0.50 min. | 3.0 min. | 10.0 min. | |
| 0 | | | 190 | 190 | 0 |
| 3 | 150 | 45 | 35 | 30 | 17 |
| 5 | 100 | 40 | 30 | 30 | 56 |

EXAMPLE 22

The quaternary nitrogen-containing cellulose prepared in Example 17 above was employed as a retention aid in the manufacture of paper. Handsheets were prepared from a bleached kraft pulp at a pH of 6.0 and measurement of properties made for comparison purposes on pulp, on pulp plus titanium dioxide, and on pulp plus titanium dioxide plus the quaternary nitrogen-containing cellulose. Results obtained are summarized in Table V below:

TABLE V [1]

| | Pulp | Pulp plus 9.09 wt. percent $TiO_2$ | Pulp plus 9.09 wt. percent $TiO_2$ plus 0.3 wt. percent cellulose derivative |
|---|---|---|---|
| Williams freeness at 26° C. (seconds) | 150 | 153 | 103 |
| Percent decrease in freeness time | | 0 | 33 |
| Percent light transmission in white water | 98.0 | 11.5 | 73.5 |
| Percent light transmission in white water after overnight settling | 98.0 | 14.5 | 85.0 |
| Ash (wt. percent) | 0.20 | 1.04 | 3.89 |
| Basis weight (lbs. per ream) | 45.9 | 46.1 | 46.3 |
| Dry tensile strength (kg./15 mm.) [2] | 8.8 | 8.7 | 6.8 |
| Brightness: | | | |
| Wire side | 81.0 | 82.5 | 85.0 |
| Felt side | 81.0 | 82.5 | 85.0 |
| Opacity: | | | |
| Wire side | 67.5 | 73.0 | 83.5 |
| Felt side | 66.5 | 72.0 | 83.5 |
| Fold test (M.I.T.) [3] | 727 | 571 | 546 |
| Bursting strength (lbs.) | 50.5 | 49.5 | 40.0 |
| Gurley densitometer (seconds/100 cc. air) | 50.6 | 62.2 | 40.8 |
| Pinholes per 8" x 8" sheet (by microscopic evaluation) | $8.2 \times 10^{12}$ | $4.8 \times 10^{12}$ | None |
| Sheffield smoothness (0–400 range) | 372 | 372 | 360 |

[1] All data were obtained using TAPPI procedures excepting the light transmission and microscopic data.
[2] Corrected to 50 lb. basis weight.
[3] Average of five determinations.

Consideration of the above data indicates that addition of the quaternary nitrogen-containing cellulose derivative to the furnish greatly improved the retention of titanium dioxide.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A quaternary nitrogen-containing cellulose ether of the structural formula:

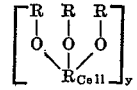

wherein $R_{Cell}$ is the residue of an anhydroglucose unit, $y$ is an integer having a value of from about 50 to about 20,000, and each R individually represents a substituent group of the general formula:

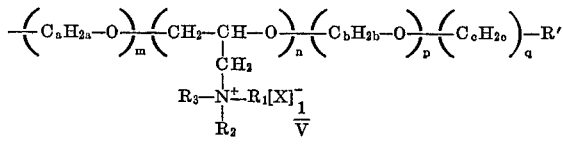

wherein:

$a$ is an integer having a value of from 2 to 3;
$b$ is an integer having a value of from 2 to 3;
$c$ is an integer having a value of from 1 to 3;
$m$ is an integer having a value of from zero to 10;
$n$ is an integer having a value of from zero to 3;
$p$ is an integer having a value of from zero to 10;
$q$ is an integer having a value of from zero to 1;
R' is a member selected from the group consisting of

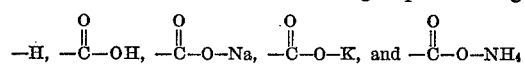

with the proviso that when $q$ is zero then R' is —H;
$R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least 2 carbon atoms separating the oxygen atom from the nitrogen atom, and with the further proviso that the total number of carbon atoms in radicals represented by $R_1$, $R_2$ and $R_3$ is from 3 to 12 with the further proviso that when $R_1$, $R_2$ and $R_3$ are taken together the nitrogen atom to which $R_1$, $R_2$ and $R_3$ are attached can be a component of a heterocyclic ring selected from the group consisting of pyridine, α-methylpyridine, 2,5-dimethylpyridine, 2,4,6-trimethylpyridine, N-methylpiperidine, N-ethyl piperidine, N-methyl morpholine and N-ethyl morpholine; X is an anion;

V is an integer which is equal to the valence of X;

the average value of n per anhydroglucose unit of said cellulose ether is from about 0.01 to about 1; and the average value of $m+p+q$ per anhydroglucose unit of said cellulose ether is from about 0.01 to about 4.

2. A quaternary nitrogen-containing cellulose ether of the structural formula:

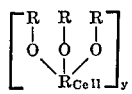

wherein $R_{Cell}$ is the residue of an anhydroglucose unit, y is an integer having a value of from about 200 to about 5,000, and each R individually represents a substituent group of the general formula:

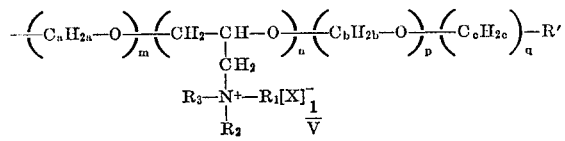

wherein:

a is an integer having a value of from 2 to 3;
b is an integer having a value of from 2 to 3;
c is an integer having a value of from 1 to 3;
m is an integer having a value of from zero to 10;
n is an integer having a value of from zero to 3;
p is an integer having a value of from zero to 10;
q is an integer having a value of from zero to 1;
R' is a member selected from the group consisting of

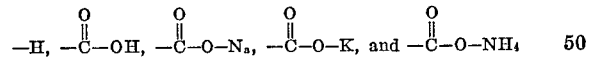

with the proviso that when q is zero then R' is —H;

$R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least 2 carbon atoms separating the oxygen atom from the nitrogen atom, and with the further proviso that the total number of carbon atoms in radicals represented by $R_1$, $R_2$ and $R_3$ is from 3 to 12 with the further proviso that when $R_1$, $R_2$ and $R_3$ are taken together the nitrogen atom to which $R_1$, $R_2$ and $R_3$ are attached can be a component of a heterocyclic ring selected from the group consisting of pyridine, α-methylpyridine, 2,5-dimethylpyridine, 2,4,6-trimethylpyridine, N-methylpiperidine, N-ethyl piperidine, N-methyl morpholine and N-ethyl morpholine;

X is an anion;

V is an integer which is equal to the valance of X;

the average value of n per anhydroglucose unit of said cellulose ether is from about 0.01 to about 1; and the average value of $m+p+q$ per anhydroglucose unit of said cellulose ether is from about 0.01 to about 4.

3. A quaternary nitrogen-containing cellulose ether of the structural formula:

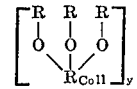

wherein $R_{Cell}$ is the residue of an anhydroglucose unit, y is an integer having a value of from about 200 to about 5,000, and each R individually represents a substituent group of the general formula:

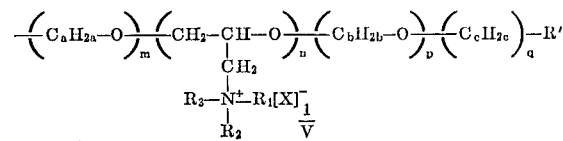

wherein:

a is an integer having a value of from 2 to 3;
b is an integer having a value of from 2 to 3;
c is an integer having a value of from 1 to 3;
m is an integer having a value of from zero to 10;
n is an integer having a value of from zero to 3;
p is an integer having a value of from zero to 10;
q is an integer having a value of from zero to 1;
R' is a member selected from the group consisting of

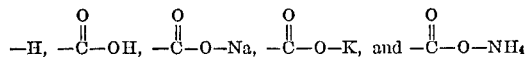

with the proviso that when q is zero then R' is —H;

$R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least 2 carbon atoms separating the oxygen atom from the nitrogen atom, and with the further proviso that the total number of carbon atoms in radicals represented by $R_1$, $R_2$ and $R_3$ is from 3 to 12 with the further proviso that when $R_1$, $R_2$ and $R_3$ are taken together the nitrogen atom to which $R_1$, $R_2$ and $R_3$ are attached can be a component of a heterocyclic ring selected from the group consisting of pyridine, α-methylpyridine, 2,5 - dimethylpyridine, 2,4,6 - trimethylpyridine, N - methylpiperidine, N - ethyl piperidine, N-methyl morpholine and N-ethyl morpholine;

X is an anion;

V is an integer which is equal to the valence of X;

the average value of n per anhydroglucose unit of said cellulose ether is from about 0.1 to about 0.5; and the average value of $m+p+q$ per anhydroglucose unit of said cellulose ether is from about 0.1 to about 2.5.

4. A quaternary nitrogen-containing cellulose ether of the structural formula:

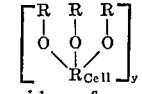

wherein $R_{Cell}$ is the residue of an anhydroglucose unit, y is an integer having a value of from about 200 to about 5,000, and each R individually represents a substituent group of the general formula:

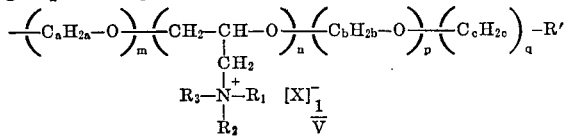

wherein:

a is an integer having a value of from 2 to 3;
b is an integer having a value of from 2 to 3;
c is an integer having a value of from 1 to 3;
m is an integer having a value of from zero to 10;
n is an integer having a value of from zero to 3;
p is an integer having a value of from zero to 10;
q is an integer having a value of from zero to 1;

R' is a member selected from the group consisting of

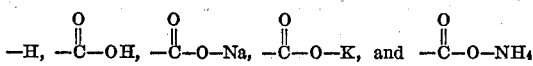

with the proviso that when $q$ is zero then R' is —H;

$R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least 2 carbon atoms separating the oxygen atom from the nitrogen atom, and with the further proviso that the total number of carbon atoms in radicals represented by $R_1$, $R_2$ and $R_3$ is from 3 to 12 with the further proviso that when $R_1$, $R_2$ and $R_3$ are taken together the nitrogen atom to which $R_1$, $R_2$ and $R_3$ are attached can be a component of a heterocyclic ring selected from the group consisting of pyridine, α - methylpyridine, 2,5 - dimethylpyridine, 2,4,6-trimethylpyridine, N-methylpiperidine, N-ethyl piperidine, N-methyl morpholine and N-ethyl morpholine;

X is an anion;

V is an integer which is equal to the valence of X;

the average value of $n$ per anhydroglucose unit of said cellulose ether is from about 0.1 to about 0.5; and the average value of $m+p+q$ per anhydroglucose unit of said cellulose ether is from about 0.8 to about 2.

5. A quaternary nitrogen-containing cellulose ether of the structural formula:

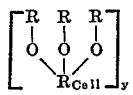

wherein $R_{Cell}$ is the residue of an anhydroglucose unit, $y$ is an integer having a value of from about 200 to about 5,000, and each R individually represents a substituent group of the general formula:

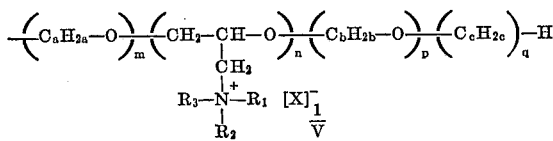

wherein:

$a$ is an integer having a value of from 2 to 3;
$b$ is an integer having a value of from 2 to 3;
$c$ is an integer having a value of from 1 to 3;
$m$ is an integer having a value of from zero to 10;
$n$ is an integer having a value of from zero to 3;
$p$ is an integer having a value of from zero to 10;
$q$ is an integer having a value of from zero to 1;

$R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least 2 carbon atoms separating the oxygen atom from the nitrogen atom, and with the further proviso that the total number of carbon atoms in radicals represented by $R_1$, $R_2$ and $R_3$ is from 3 to 12 with the further proviso that when $R_1$, $R_2$ and $R_3$ are taken together the nitrogen atom to which $R_1$, $R_2$ and $R_3$ are attached can be a component of a heterocyclic ring selected from the group consisting of pyridine, α-methylpyridine, 2,5 - dimethylpyridine, 2,4,6 - trimethylpyridine, N-methylpiperidine, N-ethyl piperidine, N-methyl morpholine and N-ethyl morpholine;

X is an anion;

V is an integer which is equal to the valence of X;

the average value of $n$ per anhydroglucose unit of said cellulose ether is from about 0.1 to about 0.5; and the average value of $m+p+q$ per anhydroglucose unit of said cellulose ether is from about 0.8 to about 2.

6. A quaternary nitrogen-containing cellulose ether of the structural formula:

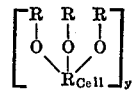

wherein $R_{Cell}$ is the residue of an anhydroglucose unit, $y$ is an integer having a value of from about 200 to about 5,000, and each R individually represents a substituent group of the general formula:

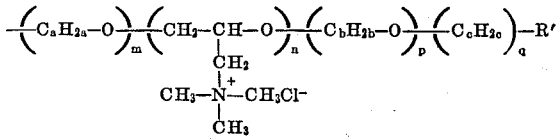

wherein:

$a$ is an integer having a value of from 2 to 3;
$b$ is an integer having a value of from 2 to 3;
$c$ is an integer having a value of from 1 to 3;
$m$ is an integer having a value of from zero to 10;
$n$ is an integer having a value of from zero to 3;
$p$ is an integer having a value of from zero to 10;
$q$ is an integer having a value of from zero to 1;

R' is a member selected from the group consisting of

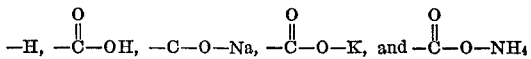

with the proviso that when $q$ is zero then R' is —H;

the average value of $n$ per anhydroglucose unit of said cellulose ether is from about 0.1 to about 0.5; and the average value of $m+p+q$ per anhydroglucose unit of said cellulose ether is from about 0.8 to about 2.

7. A quaternary nitrogen-containing cellulose ether of the structural formula:

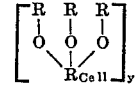

wherein $R_{Cell}$ is the residue of an anhydroglucose unit, $y$ is an integer having a value of from about 200 to about 5,000, and each R individually represents a substituent group of the general formula:

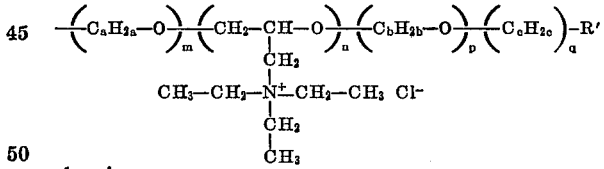

wherein:

$a$ is an integer having a value of from 2 to 3;
$b$ is an integer having a value of from 2 to 3;
$c$ is an integer having a value of from 1 to 3;
$m$ is an integer having a value of from zero to 10;
$n$ is an integer having a value of from zero to 3;
$p$ is an integer having a value of from zero to 10;
$q$ is an integer having a value of from zero to 1;

R' is a member selected from the group consisting of

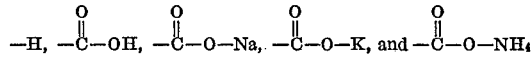

with the proviso that when $q$ is zero then R' is —H;

the average value of $n$ per anhydroglucose unit of said cellulose ether is from about 0.1 to about 0.5; and the average value of $m+p+q$ per anhydroglucose unit of said cellulose ether is from about 0.8 to about 2.

8. A quaternary nitrogen-containing cellulose ether of the structural formula:

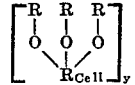

wherein $R_{Cell}$ is the residue of an anhydroglucose unit, $y$ is an integer having a value of from about 200 to about 5,000, and each R individually represents a substituent group of the general formula:

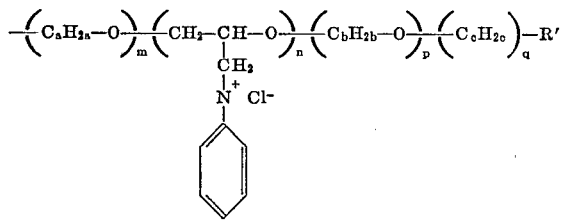

wherein:

$a$ is an integer having a value of from 2 to 3;
$b$ is an integer having a value of from 2 to 3;
$c$ is an integer having a value of from 1 to 3;
$m$ is an integer having a value of from zero to 10;
$n$ is an integer having a value of from zero to 3;
$p$ is an integer having a value of from zero to 10;
$q$ is an integer having a value of from zero to 1;
R' is a member selected from the group consisting of

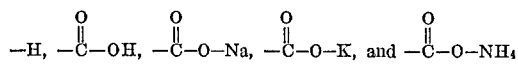

with the proviso that when $q$ is zero then R' is —H;

the average value of $n$ per anhydroglucose unit of said cellulose ether is from about 0.1 to about 0.5; and
the average value of $m+p+q$ per anhydroglucose unit of said cellulose ether is from about 0.8 to about 2.

References Cited

UNITED STATES PATENTS

| | | | |
|---|---|---|---|
| 3,087,852 | 4/1963 | Hofreiter et al. | 162—175 |
| 2,931,753 | 4/1960 | Chesbro et al. | 260—231 XR |
| 2,876,217 | 3/1959 | Paschall | 260—233.3 |
| 2,768,162 | 10/1956 | Evans | 260—231 |
| 3,388,118 | 6/1968 | Tesoro | 88—116.2 |

FOREIGN PATENTS 486,527      Great Britain.

DONALD E. GZAJA, Primary Examiner

R. W. GRIFFIN, Assistant Examiner

U.S. Cl. X.R.

8—116.2; 106—26, 186; 117—139.5; 167—85; 252—8.8; 260—213